UNITED STATES PATENT OFFICE.

KONSTANTIN TARASSOFF, OF MOSCOW, AND PETER SHESTAKOFF, OF PETROGRAD, RUSSIA.

PROCESS FOR OBTAINING SOLID PRODUCTS OF CONDENSATION FROM PHENOLS, FORMALDEHYDE, AND SALTS OF SULFO-ACIDS.

1,237,579. Specification of Letters Patent. Patented Aug. 21, 1917.

No Drawing. Application filed February 8, 1916. Serial No. 77,082.

*To all whom it may concern:*

Be it known that we, KONSTANTIN TARASSOFF and PETER SHESTAKOFF, residing, respectively, at Moscow, Russia, and Petrograd, Russia, have invented certain new and useful Improvements in Processes for Obtaining Solid Products of Condensation from Phenols, Formaldehyde, and Salts of Sulfo-Acids, of which the following is a specification.

As is well known, formaldehyde and certain derivatives thereof condense with phenols and form solid and infusible compositions. In order to facilitate or accelerate this reaction, it is often conducted in the presence of mineral or organic acids. Hard compositions obtained under these conditions do not possess the desired degree of elasticity, they are brittle, are easily broken if bent or pressed and scarcely bear any mechanical working. Besides this, the condensation in the presence of acid catalyzers takes place too rapidly and violently, the mass getting warm and becoming so dense and viscous that it is very difficult to pour it into the mold and if large quantities are dealt with it is practically impossible to transfer the mass to a mold. For this reason it is also impossible completely and perfectly to withdraw from the liquid reaction product drops of water and bubbles of gas, and the final product is therefore obtained in a porous and unhomogeneous condition.

In the specification of British Letters Patent No. 528 of 1914, granted to one of us, a process is described in which sulfonated fats and fatty oils as well as certain sulfo acids such as sulfo-fatty acids, sulfo-aromatic fatty acids and sulfo acids obtained by the treatment of petroleum with sulfuric acid, may be used in promoting the reaction between formaldehyde and phenols. These sulfo bodies have also been found to be of value in causing bodies containing no aldehyde, phenol or sulfo groups or substances in which these groups are not essential constituents, to enter into the reaction. These processes are claimed in, for example, the specification of British Letters Patent No. 7560 of 1914.

We have found that in order to remove the above mentioned drawbacks, it is necessary that the reaction takes place slowly without a rapid rise of temperature owing to the self-heating and we have found that to this end it is necessary:—

1. To add to the mixture of phenol and formaldehyde ammonium or alkali or earth alkali metal salt of organic sulfo-acids, and
2. To conduct the process of condensation in the presence of acids which do not decompose these salts, that is, such which are more feeble than the sulfo-acids.

If the phenols and formaldehydes are mixed together under the condition referred to, perfectly homogeneous, fluid solutions are obtained, the temperature of which remains the same for some length of time, and they may therefore easily be poured into any suitable kind of mold.

In order to accelerate the condensation or polymerization reaction, the solution is slightly heated, and the reaction is accompanied by a moderate development of heat, the mass boils, but the process runs perfectly quietly. The oily product of the first phase of the reaction separated from the solution, is heated to a higher temperature and thus is transformed into a solid infusible material.

Experience has shown that to this end ammonium or alkali (or earth alkali) metal salts of sulfo acids having a higher molecular weight are most suitable, the aqueous solutions of which when shaken up give a foam and possess a great emulsifying and dissolving capacity, viz., sulfo acids obtained by sulfonating crude mineral oil, or its distillates (see Russion Patent No. 27015, kl. 12), or the so-called sulfo-aromatic fatty acids which are formed by the action of concentrated sulfuric acid on mixtures of fatty oils or olein with aromatic hydrocarbons according to the specification of British Letters Patent to Twitchell No. 4741 of 1898. Before their employment, these acids are neutralized with an alkali, an earth alkali or ammonia.

In the capacity of acid catalysts different organic acids may be employed, as well as mineral acids, as for instance, hydrochloric acid and other acids which do not decompose sulfo acids.

*Example.*

300 parts by weight of commercial carbolic acid 99–100% of cresols are graually mixed with 135 parts of 40% solution of the sodium salts of sulfo acids obtained by sulfonating crude mineral oil, 9 parts of hydrochloric acid (specific gravity .14) and 150 parts of a 40% aqueous solution of formaldehyde. These materials are mixed together and heated to 65-70° C.; the reaction is accompanied by quiet ebullition. A resinous liquid mass separates from the mixture and on its surface a watery layer collects. When this latter is removed, the resinous mass is heated on a water bath until the loss in the weight, due to evaporation, reaches 70-75 parts by weight of the total amount of the materials employed. The mass is then cooled to 35-45° C., and 120 parts by weight of an aqueous solution of formaldehyde added, the mass mixed and thus a homogeneous, mobile liquid is obtained, which is poured into molds which may be open or hermetically closed, and where the liquid remains at rest for some hours. The mass is then gradually heated on a water or oil bath first for one hour to 45° C., and then the temperature is raised at more or less protracted intervals by 10-15° at a time to 100° C.

Having now described our invention, what we claim as new and desire to secure by Letters Patent is:—

1. Process of producing solid, infusible and insoluble phenol-aldehyde condensation products, comprising bringing together a phenol, formaldehyde and a salt of a sulfo acid in the presence of an acid which is weaker than the sulfo acid.

2. Process of producing solid, infusible and insoluble phenol-aldehyde condensation products, comprising bringing together a phenol, formaldehyde, a salt of sulfo acid which has emulsifying properties and an acid which is weaker than the sulfo acid.

3. Process of producing solid, infusible and insoluble phenol-aldehyde condensation products, comprising bringing together a phenol, formaldehyde, salts of sulfo acids obtained by sulfonating crude mineral oil and an acid which is weaker than the sulfo acid.

4. Process of producing solid, infusible and insoluble phenol-aldehyde condensation products, comprising bringing together a phenol, formaldehyde, a salt of a sulfo acid having a high molecular weight and an acid which is weaker than the sulfo acid.

5. Process of producing solid, infusible and insoluble phenol-aldehyde condensation products, comprising bringing together a phenol, formaldehyde, salts of sulfo acids obtained by sulfonating crude mineral oil and an acid which is weaker than the sulfo acid and slightly heating the mixture to start the reaction.

6. Process of producing solid, infusible and insoluble phenol-aldehyde condensation products, comprising bringing together a phenol, formaldehyde, salts of sulfo acids obtained by sulfonating crude mineral oil and an acid weaker than the sulfo acid and heating the reaction mixture to 65-70° C.

7. Process of producing solid, infusible and insoluble phenol-aldehyde condensation products, comprising bringing together a phenol, formaldehyde, a salt of a sulfo acid of high molecular weight and an acid weaker than the sulfo acid, heating the mixture to start the reaction, removing the water that separates out, heating the residue on a water bath until the loss of weight reaches 70-75 parts by weight of the total amount of the materials employed, cooling the mass to 35-40° C., adding a further quantity of formaldehyde, pouring the mass into molds, allowing the mass to remain at rest for some hours and then gradually raising the temperature of the mass to 100° C.

8. Process of producing solid, infusible and insoluble phenol-aldehyde condensation products, comprising bringing together a phenol, formaldehyde, a salt of an alkaline reacting base and of a sulfo acid obtained in the sulfonation of crude mineral oil and an acid weaker than the sulfo acid, heating the mixture to start the reaction, removing the water that separates out, heating the residue on a water bath until the loss of weight reaches 70-75 parts by weight of the total amount of the materials employed, cooling the mass to 35-40° C., adding a further quantity of formaldehyde, pouring the mass into molds, allowing the mass to remain at rest for some hours and then gradually raising the temperature of the mass to 100° C.

In testimony whereof we affix our signatures in presence of two witnesses.

KONSTANTIN TARASSOFF.
PETER SHESTAKOFF.

Witnesses:
R. LOVIAGHIN,
MOSES LUISSAREMCO.